United States Patent [19]

Kondo et al.

[11] Patent Number: 4,845,560
[45] Date of Patent: Jul. 4, 1989

[54] HIGH EFFICIENCY CODING APPARATUS

[75] Inventors: Tetsujiro Kondo; Yashuhiro Fujimori, both of Kanagawa, Japan

[73] Assignee: Sony Corp., Tokyo, Japan

[21] Appl. No.: 195,271

[22] Filed: May 18, 1988

[30] Foreign Application Priority Data

May 29, 1987 [JP] Japan .................. 62-133924

[51] Int. Cl.[4] .............................. H04N 7/13
[52] U.S. Cl. ................... 358/133; 358/105; 358/135; 358/136
[58] Field of Search ............... 358/105, 133, 135, 136

[56] References Cited

U.S. PATENT DOCUMENTS

| 4,217,609 | 8/1980 | Hatori | 358/136 |
| 4,562,468 | 12/1985 | Koga | 358/136 |
| 4,745,474 | 5/1988. | Schiff | 358/133 |
| 4,780,760 | 10/1988 | Waldman | 358/105 |

Primary Examiner—Howard W. Britton
Attorney, Agent, or Firm—Alvin Sinderbrand

[57] ABSTRACT

A high efficiency coding apparatus controls the amount of generated information so that it does not surpass the transmission capacity of a transmission path when variable-length coding is employed for varying a word length corresponding to a dynamic range. With respect to a still block, distribution in which a movement amount is introduced is formed taking into account that frame-dropping processing is made to obtain the number of dynamic range occurrence. Not only threshold values in the level direction for defining a word length but also movement threshold values for the frame-dropping processing are changed to control the amount of generated information. As a result, the amount of generated information is controlled excellently without an increase in quantization errors.

6 Claims, 7 Drawing Sheets

4 LINES

4 PICTURE ELEMENTS

HIGH EFFICIENCY CODING APPARATUS

BACKGROUND OF THE INVENTION

1. Field of the Invention

This invention relates to a high efficiency coding apparatus applied to a picture signal and, more particularly, to a high efficiency coding apparatus in which the transmission rate of recorded data is controlled to correspond to the capacity of a transmission path when a digital video signal is recorded on a magnetic tape.

2. Description of Prior Art

The present applicant has proposed a high efficiency coding apparatus for obtaining a dynamic range equal to the difference between a maximum value and a minimum value of plural picture elements contained in a two-dimensional block and for performing coding adapted to the obtained dynamic range as described in the specification of the Japanese Patent Application No. 266407/1984. Further, as described in the specification of the Japanese Patent Application No. 232789/1985, a high efficiency coding apparatus has been proposed for the coding adapted to a dynamic range with respect to a three-dimensional block formed of picture elements of areas respectively contained in plural frames. Moreover, a variable-length coding method for varying the bit number depending on a dynamic range so as to keep constant the maximum distortion occurring at the time of quantization has been proposed in the specification of the Japanese Patent Application No. 268817/1985.

The above-mentioned high efficiency coding adapted to the dynamic range (called "ADRC") enables great compression of the amount of data to be transmitted and is therefore suitable for application to a digital VTR. Particularly, the variable-length ADRC can enhance the compression rate. However, since in the variable-length ADRC, the data amount to be transmitted varies depending on the contents of pictures, buffering processing is necessary when employing a transmission path with a fixed rate, such as a digital VTR for recording a predetermined amount of data as one track.

For a buffering system of the variable-length ADRC, as described in the Japanese Patent Application No. 257586/1986, the present applicant has proposed the use of a buffering system in which distribution of cumulative-type dynamic ranges is formed, a set of threshold values prepared in advance are applied to such distribution, the amount of data generated in a predetermined period, for instance, in one frame period is obtained, and the generated data mount is controlled so as not to exceed a target value.

FIG. 10 shows a graph of cumulative-type distribution referred to in such Japanese patent application No. 257586/1986. In FIG. 10, the abscissa is the dynamic range, and the ordinate is a number of occurrence. T1 to T4 depicted in the abscissa are threshold values. The bit number of quantization is determined by the threshold values T1 to T4. In the case of the dynamic range DR within the range from a maximum value to T1, the bit number of quantization is made to be 4; in the range of T1−1 to T2, the bit number of the quantization is made to be 3; in the range of T2−1 to T3, the bit number of quantization is made to be 2; in the range of T3−1 to T4, the bit number of quantization is made to be 1; and in the range of T4−1 to a minimum value, the bit number of quantization is made to be zero (that is, no code signal is transmitted).

With respect to the cumulative-type distribution, the occurrence numbers ranging from the threshold value (T1−1) to the threshold value T2 are accumulated with regard to the occurrence numbers of dynamic ranges from the maximum value to the threshold value T1 in order to obtain distribution of the dynamic range DR in a frame period. The occurrence numbers from the threshold value (T2−1) to the threshold value T3 are accumulated similarly. Similar processing is repeated thereafter. As a result, the occurrence number at which the dynamic range DR is the minimum value is equal to the total number (M×N) of the block contained on one frame.

In this manner, when cumulative-type distribution is formed, the cumulative number up to the threshold value T1 becomes $x_1$, the cumulative number up to the threshold value T2 becomes $(x_1+x_2)$, the cumulative number up to the threshold value T3 becomes $(x_1+x_2+x_3)$, and the cumulative number up to the threshold value T4 becomes $(x_1+x_2+x_3+x_4)$. As a result, the amount of generated information (total bit number) for a period of one frame is shown by the following equation:

$$4(x_1 - 0) + 3[(x_1 + x_2) - x_1] +$$
$$2[(x_1 + x_2 + x_3) - (x_1 + x_2)] +$$
$$1[(x_1 + x_2 + x_3 + x_4) - (x_1 + x_2 + x_3)] =$$
$$4x_1 + 3x_2 + 2x_3 + x_4.$$

The threshold values T1 to T4 are selected so that the above-mentioned amount of generated information does not exceed a target value. When an optimum value is obtained with the alteration of the threshold values, said values $x_1$ to $x_4$ are changed depending on the threshold values, and the generated information amount is calculated for every set of each threshold value. Therefore, once a cumulative-type distribution table is formed, the calculation of generated information can be effected easily.

A system for converging the rate of transmission data into a target value by changing the four threshold values in the level direction, for instance, as mentioned above, is not sufficient in performance, for example, in reducing distortion of quantization noises, etc.

OBJECT OF THE INVENTION

An object of the invention is, therefore, to provide a high efficiency coding apparatus capable of achieving buffering processing of transmission data while suppressing the deterioration of the quality of reproduced pictures by changing threshold values for frame-dropping processing in the time direction as well as by changing threshold values in the level direction.

SUMMARY OF THE INVENTION

According to one aspect of the present invention, there is provided a high efficiency encoding apparatus which comprises: a circuit for obtaining a maximum value of plural picture element data included in a block which is composed of areas belonging to plural fields of a digital picture signal, a minimum value of said plural picture element data and a first dynamic range for every said block; a circuit for averaging corresponding picture element data between plural fields among plural picture element data of every block; a circuit for obtaining a maximum value, a minimum value and a second dynamic value of plural picture element data of an averaged block; a circuit for detecting a movement amount of the block on the basis of plural picture elements in each block; a circuit for giving to an area with less movement and an area with greater movement a first number with respect to the first dynamic range and a second number smaller than the first number with respect to the second dynamic range, respectively, by the use of a movement amount of the block detected as a border line by the detection circuit, accumulating said first and second numbers in a predetermined period and obtaining distribution; circuits for averaging corresponding picture element data between plural fields with respect to a block having less movement than a predetermined amount and performing frame-dropping processing; circuits for compression-coding the plural picure element data in said block depending on the first or second dynamic range of the block; and circuits and for selecting said predetermined movement amount and a coding bit number depending on distribution and a transmission capacity of a transmission path.

In a high efficiency coding apparatus of the present invention for performing the control so that the amount of generated information does not exceed a transmission capacity of a transmission path when the high efficiency coding is executed, a picture is divided into a number of three-dimensional blocks. The maximum values and minimum values of picture element data contained in each block and dynamic ranges are provided. Also, a movement amount (for instance, a maximum frame difference $\Delta F$) is detected from picture element data different in time from one another and included in the same block. In a still block having a little amount of this movement, the amount of generated information is reduced by frame-dropping processing.

In the frame-dropping processing, a dynamic range DR2, which is the result of the averaging operation, is lowered as compared with a dynamic range DR3 for which no averaging operation is performed. For this reason, the position of a still block at an occurrence number block table becomes the dynamic range DR2 lower in level than the original dynamic range DR3. This means a reduction in the amount of generated information. As a result, to obtain the amount of generated information, distribution tables on the two dynamic ranges DR3 and DR2 must be prepared. In the case of a block with the dynamic range DR2, the occurrence number of (+1), for example, is given for a value equal to or more than ($\Delta F+1$) with respect to a maximum frame difference $\Delta F$ as a movement amount. In the case of the dynamic range DR3, the occurrence number of (+2), for example, is given for the range of (0 to F) with respect to the maximum difference $\Delta F$. In other words, the occurrence number of (+2) is allotted for the range where a block is handled as a moving one at the time of decision, while the occurrence number of (+1) is allotted for the range where a block is handled as a still one. The distribution tables are converted into cumulative-type distribution tables for every amount of movement.

By the use of the cumulative-type distribution tables, threshold values and movement threshold values in the level direction are determined so that the amount of generated information does not exceed a target value. Whether the frame-dropping processing employed is decided on the basis of the movement threshold values. Also, variable-length coding, for example, the word length in the ADRC, is controlled by the threshold values in the level direction. Coded data obtained by the variable-length ADRC is recorded onto a magnetic tape.

Since a movement threshold value for use as a reference in deciding whether the frame dropping process should be performed is changed in accordance with this invention, excellent buffering which cannot be achieved only with the change in the level direction, can be performed.

Also, determining the amount of generated information, the difference in dynamic range between a still block subjected to frame dropping and a moving block is taken into account. As a result, the amount of generated information can be obtained with high accuracy.

BRIEF DESCRIPTION OF THE DRAWINGS

The invention will be more apparent from the following detailed description when taken in conjunction with the accompanying drawings, in which.

In the several views of the drawings drawings, the same reference numerals denote the same structural elements.

DESCRIPTION OF THE PREFERRED EMBODIMENT

Figure 1:
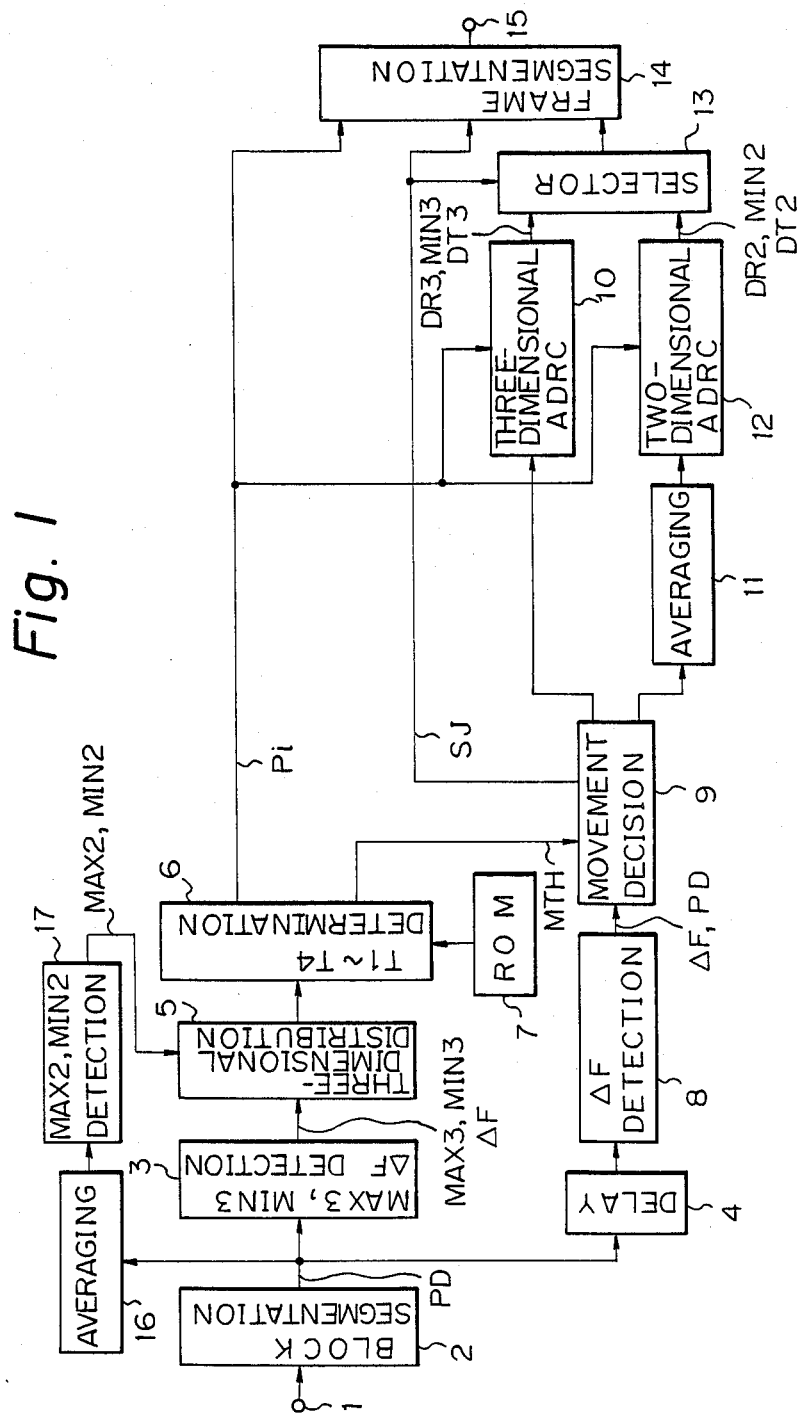
FIG. 1 is a block diagram showing a circuit arrangement according to one embodiment of the invention included in a recording system.

An embodiment of the invention will be described hereunder referring to the drawings. Description will be given in the order mentioned below.
a. Circuit included in the recording system
b. ADRC encoder
c. Forming a three-dimensional distribution table
d. Three-dimensional distribution generator and threshold-value determination circuit.

a. Circuit included in the recording system

FIG. 1 shows a circuit included in a recording system in accordance with one embodiment of the invention. In FIG. 1, a digital video signal in which one sample is quantized with eight bits, for instance, is supplied to an input terminal indicated at 1. The digital video signal is fed to a block segmentation circuit 2 in which data in the order of television scanning is converted into data in the order of blocks.

Figures 2, 3, 4:
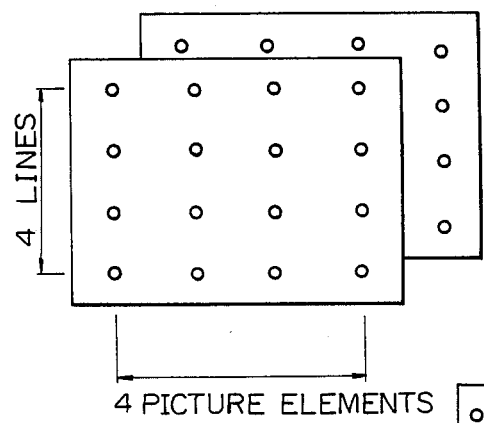
FIGS. 2, 3 and 4 are schematic diagrams to which reference will be made in describing the composition of a block.

At the block segmentation circuit 2, a picture of one frame of (520 lines $\times$ 720 picture elements), for example, is segmented into (M$\times$N) blocks as shown in FIG. 2. Each block is selected to have a so-called two-frame size. Each frame is composed of (4 lines$\times$4 picture elements) as shown in FIG. 3, for instance. Moreover, as shown in FIG. 4, a sub-sampling pattern is employed to provide an offset between frames by sub-sampling. In FIG. 4, ○ indicates a picture element to be transmitted, and Δ indicates a picture element which is not transmitted. Such sub-sampling pattern enables good interpolation in still areas in the case where the interpolation is carried out for thinned picture elements. The digital video signal converted into the blocks $B_{11}$, $B_{12}$, $B_{13}$ ... $B_{MN}$ is generated from the block segmentation circuit 2.

The output signal of the block segmentation circuit 2, that is, picture element data PD, is supplied to a detection circuit 3, a delay circuit 4, and an averaging circuit 16. The averaging circuit 16 adds data of picture elements at the same position in two areas included in one block and divides the result of the addition by two to convert an original three-dimensional block into a two-dimensional block. The output signal of the averaging circuit 16 is supplied to a detection circuit 17.

The detection circuit 3 detects not only a maximum value MAX3 and a minimum value MIN3 of each block but also a maximum frame difference ΔF. The detection circuit 17 detects the maximum value MAX2 and the minimum value MIN2 of the averaged or two-dimensional block. As mentioned before, since a block is composed of areas which belong to two frames, a maximum frame difference ΔF of the two areas is detected. The maximum frame difference ΔF is the maximum value among differences obtained by calculating each difference in data of picture elements at the same position between two areas constituting one block.

The maximum value MAX3, the minimum value MIN3 and the maximum frame difference ΔF from the detection circuit 3 and the MAX2 and MIN2 from the detection circuit 17 are fed to a three-dimensional distribution generator 5. The generator 5 calculates the occurrence numbers of dynamic ranges DR2 and DR3 using the maximum frame difference ΔF as a parameter and converts the occurrence numbers of the dynamic ranges into cumulative-type distribution as described later.

A threshold-value determination circuit 6 determines optimum threshold values T1 to T4 and a movement threshold value MTH using a cumulative-type distribution table. The term "optimum threshold value" means a threshold value for coding so that the total bit number per frame of data does not exceed a transmission capacity of a transmission path. The optimum threshold value is obtained using a movement threshold value MTH as a parameter. A ROM 7 is provided in association with the threshold-value determination circuit 6. A program for obtaining the optimum threshold value is stored in the ROM 7.

Picture element data PD from the block segmentation circuit 2 is fed to a frame-difference detecting circuit 8 through the delay circuit 4. The detecting circuit 8 detects the maximum frame difference ΔF in a manner similar to that of the above-described detection circuit 3. The maximum frame difference ΔF and the picture element data PD from the frame-difference detecting circuit 8 are supplied to a movement decision circuit 9. The circuit 9 compares the movement threshold value MTH from the threshold-value decision circuit 6 and the maximum frame difference ΔF from circuit 8 to decide whether a block to be processed is a moving block or a still block.

A block having a maximum frame difference ΔF > the movement threshold value MTH is determined in the movement decision circuit 9 to be a moving block, while a block having a maximum frame difference ΔF ≦ the movement threshold value MTH is determined to be a still block. Picture element data of a moving block are supplied to a three-dimensional ADRC encoder 10. Further, picture element data of a still block are supplied to an averaging circuit 11. In a manner similar to the above-mentioned averaging circuit 16, the averaging circuit 11 adds data of picture elements at the same position in two areas included in one block and divides the result of the addition by two to develop a block having a number of picture elements equal to one half of the number of picture elements in the original block. Such processing is called "frame-dropping processing." The output signal of the average circuit 11 is fed to a two-dimensional ADRC encoder 12. The threshold values T1 to T4 are supplied to these encoders 10 and 12 from the threshold-value decision circuit 6.

At the three-dimensional ADRC encoder 10, the maximum value MAX 3 and the minimum value MIN3 are detected among a total of 32 picture element data (4 lines×4 picture elements×2 frames) and the dynamic range DR3 can be obtained (MAX3−MIN 3=DR3). The bit number of a code signal DT3 is defined by the relationship between the dynamic range DR3 of the block and the threshold value. For example, in a block of (DR maximum value≧DR 3≧T1), a four-bit code signal is developed; in a block of (T1−1≧DR3≧T2), a three-bit code signal is formed; in a block of (T2−1≧DR3≧T3), a two-bit code signal is formed; in a block of (T3−1≧DR3≧T4), a one-bit code signal is developed; and in a block of (T4−1≧DR3≧minimum value), a zero-bit code is given to indicate that no code signal is sent.

For instance, in the case of the coding of four-bit quantization, the detected dynamic range DR3 is divided into 16 ($=2^4$), and the four-bit code signal DT3 is generated corresponding to the range to which the level of data belongs after each minimum value MIN of picture element data has been eliminated.

At the two-dimensional ADRC encoder 12, the maximum value MAX 2, the minimum value MIN2 and the dynamic range DR2 are detected to develop a code signal DT2 in a manner similar to the above-mentioned three-dimensional ADRC encoder 10. It is to be noted here that the objective of coding is to provide data whose number of picture elements has been reduced to ½ by the averaging circuit 11 of the previous stage.

The output signal (DR3, MIN3, DT3) of the three-dimensional ADRC encoder 10 and the output signal (DR2, MIN2, DT2) of the two-dimensional ADRC encoder 12 are supplied to a selector 13. The selector 13 is controlled by a decision signal SJ from the movement decision circuit 9. More specifically, the output signal of the three-dimensional ADRC encoder 10 is selected by the selector 13 in the case of a moving block. In the case of a still block, the selector 13 selects the output of the two-dimensional ADRC encoder 12. The output signal of the selector 13 is supplied to a frame segmentation circuit 14.

In addition to the output signal of the selector 13, a threshold value code Pi for designating the setting of a threshold value and the decision code SJ are supplied to the frame segmentation circuit 14. The threshold value code Pi varies with two-frame unit, while the decision code SJ changes with one frame unit. The circuit 14 converts an input signal into recording data of frame structure. In the frame segmentation circuit 14, the processing of coding for an error correction code is made when necessary. The recording data obtained at an output terminal 15 of the frame segmentation circuit 14 is supplied conventionally to a rotating head through a recording amplifier, a rotating transformer, etc. and recorded onto a magnetic tape, all of which are not shown.

b. ADRC encoder

Figure 5:
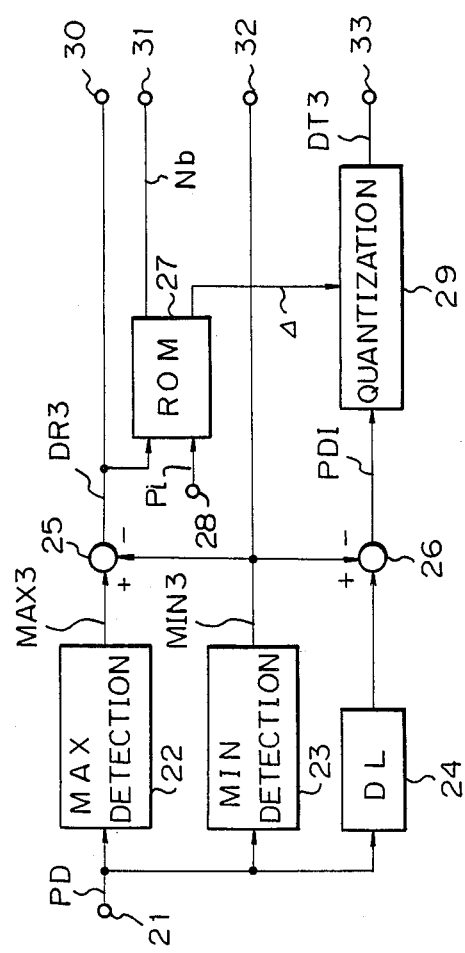
FIG. 5 is a block diagram of one example of an ADRC encoder included in the circuit of FIG. 1.

FIG. 5 shows a structure of one example of the three-dimensional ADRC encoder 10. In FIG. 5, a maximum-value detecting circuit 22, a minimum-value detecting circuit 23 and a delay circuit 24 are connected to an input terminal 21 which receives the picture element data PD. A maximum value MAX3 detected by the maximum-value detecting circuit 22 is supplied to a subtraction circuit 25. A minimum value MIN3 detected by the minimum-value detecting circuit 23 is supplied to the subtraction circuit 25 so that a dynamic range DR3 is provided as the output from the subtraction circuit 25.

Picture element data is also supplied from the terminal 21 to a subtraction circuit 26 through the delay circuit 24. The minimum value MIN3 is supplied from the circuit 23 to the subtraction circuit 26. Picture element data PDI reduced by the minimum value MIN3 is generated as the output from the circuit 26. The picture element data PDI is supplied to a quantization circuit 29. The dynamic range DR3 is supplied from the subtraction circuit 25 to an output terminal 30 and also to a ROM 27. The ROM 27 also receives from a terminal 28 the threshold value code Pi generated at the threshold-value determination circuit 6. A quantization step $\Delta$ and a bit-number code Nb indicative of the bit number are generated from the ROM 27.

The quantization step $\Delta$ is supplied to the quantization circuit 29, and a code signal DT3 is developed in the latter by the multiplication of the data PDI reduced by the minimum value by the quantization step $\Delta$. The code signal DT3 is supplied to an output terminal 33. The output signals DR3, Nb, MIN3 and DT3 generated at output terminals 30, 31, 32 and 33 are supplied to the frame segmentation circuit 14. The bit number code Nb is used for selection of effective bits at the circuit 14.

c. Forming a three-dimensional distribution table

Figure 6A:
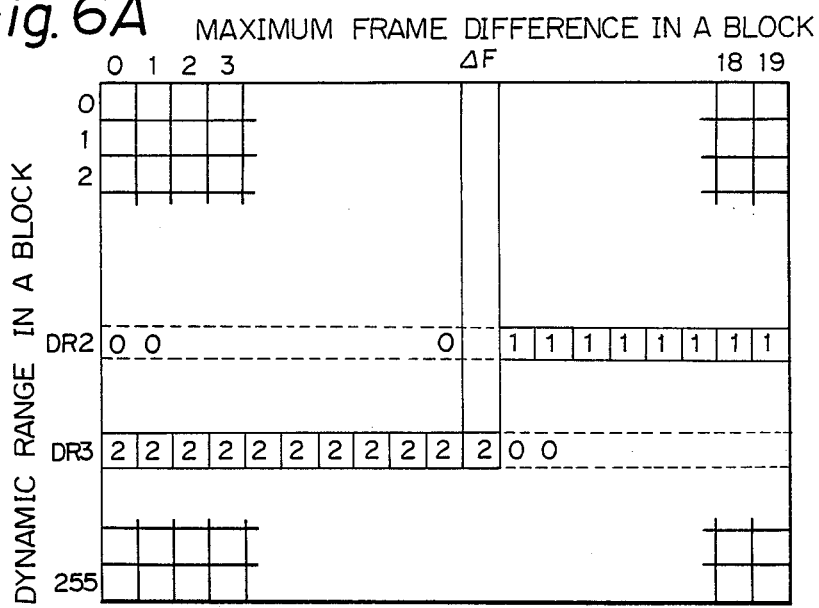
FIGS. 6A, 6B and 7 are schematic diagrams to which reference will be made in describing distribution tables.
Figure 6B:
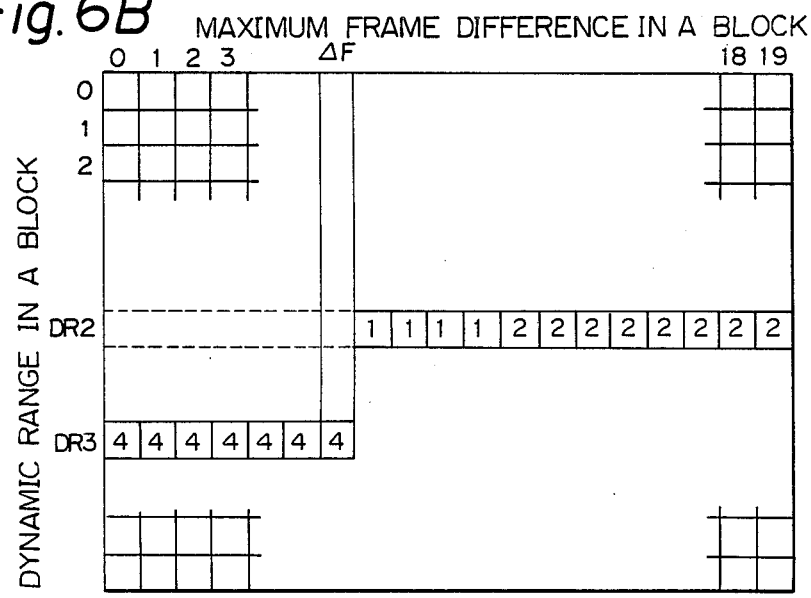

The forming of the three-dimensional distribution table is made at the three-dimensional distribution generator 5 will be described with reference to FIGS. 6A and 6B. In each of FIGS. 6A and 6B, the ordinate indicates the dynamic range DR3, while the abscissa represent the maximum frame difference $\Delta F$. The dynamic range DR3 (=MAX3−MIN3) and the maximum frame difference $\Delta F$ are the ones detected by the detection circuit 3. The dynamic range DR2 (=MAX2−MIN2) is the one detected by the detection circuit 17. These values MAX3, MIN3, MAX2, MIN2 and $\Delta F$ are detected at the same time. The maximum frame difference $\Delta F$ can have values in the range of 0 to 255. However, in this example, all the values equal to or more than 19 are treated as 19 for simplicity as shown in FIG. 6.

Figure 7:
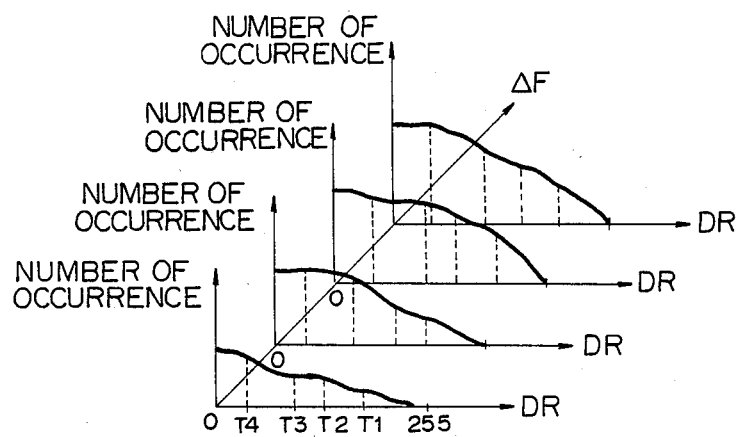
Figure 10:
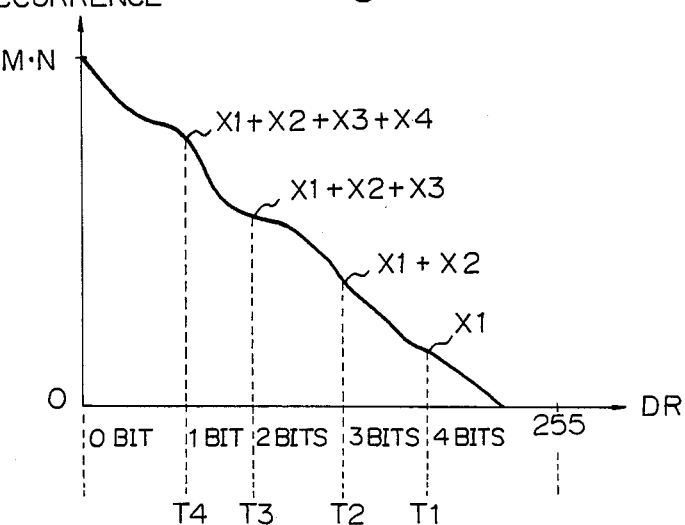
FIG. 10 is a schematic diagram to which reference is made in explaining a buffering circuit proposed before.

For every block, the range of (0 to $\Delta F$) is made to be (+2) as an occurrence number among areas designated by the dynamic range DR3, and the range of ($\Delta F+1$ to 19) is made to be (+1) as an occurrence number among areas designated by the other dynamic range DR2. The values (+2) and (+1) correspond to the fact that the amount of generated information of the still block is one half of that of the moving block. This processing is done for blocks over a whole picture, for example. When the movement threshold value MTH smaller than the maximum frame difference $\Delta F$ is given, the occurrence number of (+2) is allotted to the range of (0 to $\Delta F$), because the blocks are treated as the moving ones. Additionally, when the movement threshold value MTH larger than the maximum frame difference $\Delta F$ is supplied, the frequency or occurrence number of (+1) is allotted to the range of ($\Delta F+1$ to 19) since the blocks are treated as still blocks. For example, the block next to the block shown in FIG. 6A has the same dynamic ranges DR3 and DR2, and if they have different maximum frame differences $\Delta F$, the distribution table of FIG. 6A changes to that shown on FIG. 6B by the addition of information of these blocks. The distribution tables collected and calculated over the whole picture are converted into cumulative-type distribution tables by performing accumulation toward 0 from 255 of the dynamic range DR3 for every value of the maximum frame difference $\Delta F$. The purpose of the conversion into the cumulative type is to easily and immediately obtain the amount of generated information. FIG. 7 is a graph for showing the cumulative-type distribution tables thus obtained with respect to each maximum frame difference.

The threshold-value determination circuit 6 determines a set of the optimum threshold values of the movement threshold value MTH using the cumulative-type distribution tables. This determination is made with the following method. By giving an initial value as the movement threshold value MTH to the extent that no jerkiness is caused in a reproduced picture, the maximum frame difference $\Delta F$ selects a predetermined cumulative-type distribution table. In this distribution table, a set of the threshold values are determined by varying the threshold values so that the amount of generated information (total bit number) does not exceed a target value. If the chasing into the target value is impossible, a set of the threshold values are searched once again so that said amount does not exceed the target value by changing the movement threshold value MTH. The processing for determining the set of the threshold values is performed according to the program stored in the ROM 7.

d. An example of the three-dimensional distribution generator and the threshold-value determination circuit The three-dimensional distribution generator 5 and the threshold-value determination circuit 6 may have the structure shown in FIG. 8 by way of example. In this structure, a RAM 46 for a moving block and a RAM 66 for a still block are provided. The separate provision of these RAMs is due to the fact that it is difficult in terms of operation speed to provide the same memory for the RAMs, designate points corresponding to the dynamic ranges DR3 and DR2 and write into one block interval (+2) and (+1).

The structure and operation of the RAM 46 for a moving block will now be described.

Figure 8:
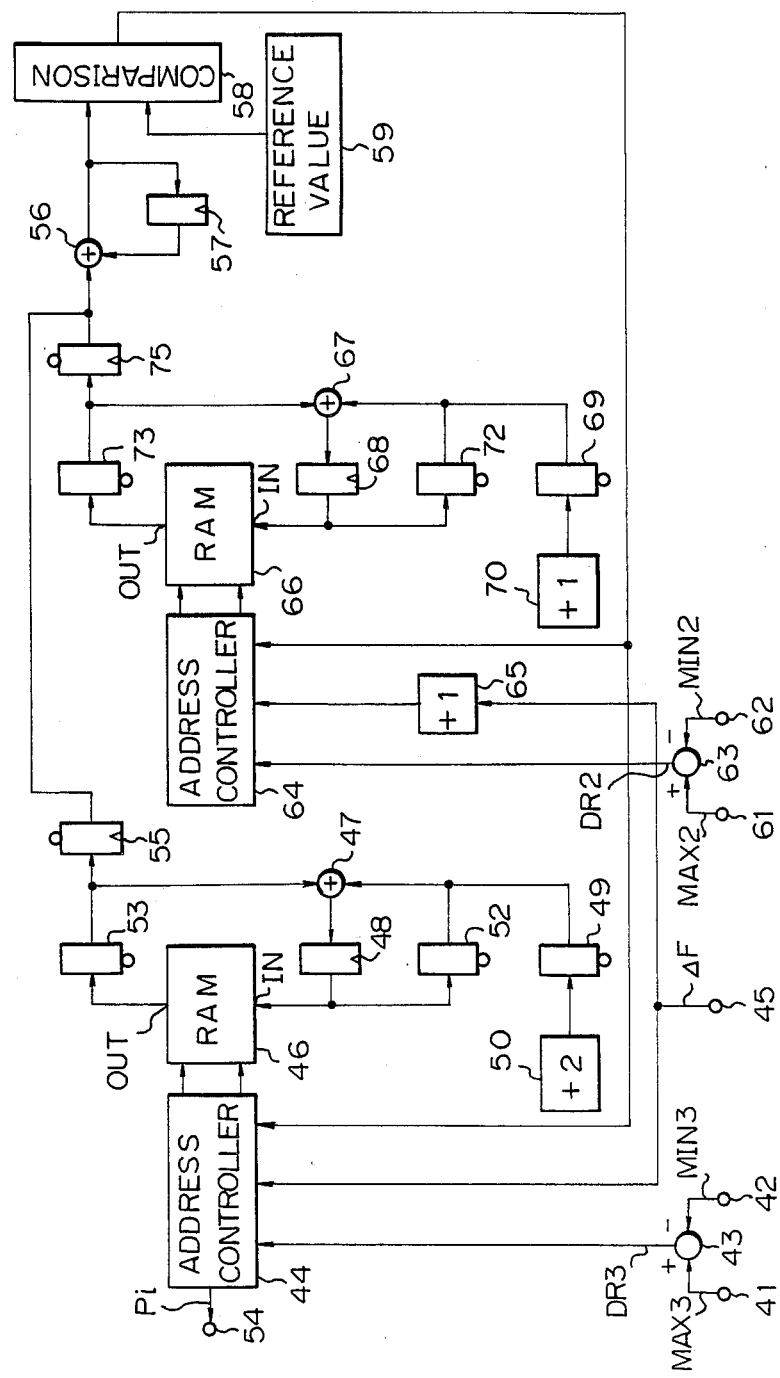
FIG. 8 is a block diagram of an example of a three-dimensional distribution generator and a threshold-value determination circuit included in the circuit of FIG. 1.

In FIG. 8, the maximum value MAX3 from an input terminal 41 and the minimum value MIN3 from an input terminal 42 are supplied to a subtraction circuit 43. The dynamic range DR3 for a moving block expressed by (MAX3−MIN3=DR3) is supplied from subtraction circuit 43 to an address controller 44. The maximum frame difference $\Delta F$ is also supplied to the controller 44 from an input terminal 45. This controller 44 generates addresses in the horizontal (upper) and vertical (lower) directions with respect to a RAM 46. The RAM 46 has addresses (0 to 255) corresponding to the dynamic range DR3 in the vertical direction and adressess (0 to 19) in the horizontal direction, and all the contents of the memory are cleared in the initial state.

Data read out of the RAM 46 is supplied through a register 53 having an output control function to an addition circuit 47, and the output of the circuit 47 is supplied via a register 48 to the RAM 46. An address depending on the dynamic range DR3 and the maximum frame difference ΔF is fed to the RAM 46 so that distribution may be stored therein. Thus, the output data of the RAM 46 is supplied to the addition circuit 47 through the register 53, and the output data of the addition circuit 47 is written into the same address of the RAM 46 through the register 48.

The output data of a (+2) generating circuit 50 is supplied to the addition circuit 47 through a register 49. The (+2) generating circuit 50 produces a value of (+2) which is written into the range of (0~ΔF) by the address controller 44. A distribution table (FIGS. 6A, 6B) concerning the dynamic range DR3 of a picture (two frames) is developed in the RAM46 by said register 53, the addition circuit 47, the register 48, the (+2) generating circuit 50, etc.

Next, a register 52 and the register 53 are brought to an output-enabling state and the register 49 is brought to an output-unable state, so that a cumulative distribution table can be made. Addresses in the horizontal direction (upper addresses) which are incremented up to 19 starting from 0 of the maximum frame difference ΔF and addresses in the vertical direction (lower addresses) which are decremented by (−1) from 255 in each value of the maximum frame differences ΔF are supplied to the RAM 46.

With each of the addresses, data read out of the RAM 46 is added at the addition circuit 47 to previous data stored in the register 52. Since the output data of the addition circuit 47 is written in the RAM 46 at the same address as the read-out address, the cumulative-type distribution table on the dynamic range DR3 has been stored into the RAM 46 at the time when the addresses have been decremented from 255 to zero.

To perform the calculation of the amount of generated information, the threshold values T1 to T4 in the level direction are supplied sequentially to the RAM 46 as a lower address signal from the address controller 44. An upper address signal is defined by the maximum frame difference ΔF. In response to the threshold value T1, distribution $x_1$ is read out of the RAM 46 and supplied through registers 53 and 55 to an addition circuit 56. The output signal of the addition circuit 56 is fed back to the circuit 56 through a register 57 and supplied to a comparison circuit 58.

The threshold value T2 is supplied to the RAM 46 after the threshold value T1, and $(x_1+x_2)$ is read out from the RAM 46 and supplied through the registers 53 and 55 to the addition circuit 56. At the addition circuit 56, the addition of $(x_1+x_2)$ to $x_1$ stored in the register 57 is performed. The added output is stored in the register 57. Next, with the supply of the threshold value T3 to the RAM 46, $(x_1+x_2+x_3)$ is read out of the RAM 46 to the addition circuit 56 and then added to $(2x_1+x_2)$ stored in the register 57. Further, the threshold value T4 is supplied to the RAM 46. Similarly, the output read out from the RAM 46 and the output of the register 57 are added at the circuit 56. As a result, the output of the addition circuit 56 becomes $4x_1+3x_2+2x_3+1x_4$.

The output of the addition circuit 56 is nothing but the amount of generated information corresponding to the threshold values T1 to T4.

For the dynamic range DR2, the structures of the distribution generator and the threshold-value determination circuit are provided similarly to those described for the dynamic range DR3.

Specifically, a RAM 66 and an address controller 64 are employed. A dynamic range DR2 from a subtraction circuit 63 and a value of (ΔF+1) obtained by a (+1) generating circuit 65 from a maximum frame difference ΔF are supplied to the address controller 64. The subtraction circuit 63 performs the subtraction of a maximum value MAX2 from an input terminal 61 and a minimum value MIN2 fed from an input terminal 62.

In connection with the RAM 66, an addition circuit 67, registers 68, 69, 72, 73 and 75, and a (+1) generating circuit 70 are provided. The control for the RAM 66 is essentially the same as that of the RAM 46. Although +2 is written into the RAM 46 with respect to 0 to ΔF, +1 for developing distribution is written in the range of (ΔF+1) to 19 in the RAM 66. The outputs of the register 75 and the register 55 are subjected to a wired-OR operation on the output side of the register 75. The amount of generated information supplied to the addition circuit 56 is consequently produced by both the dynamic range DR3 and the dynamic range DR2.

The outputs of comparison circuit 58 becomes "0" when said amount of generated information exceeds a reference value (target value), whereas when the amount of generated information does not exceed the reference value, circuit 58 generates a comparison output signal "1". The comparison output signal is supplied to the address controllers 44 and 64. When the comparison output is "1", the address controller 44 stops updating the threshold value and generates on an output terminal 54 a threshold code Pi indicative of the threshold value at that time.

Processing for converting the above-mentioned distribution tables into tables of the cumulative type and processing for determining the optimum threshold values can be carried out during a vertical blanking period.

With the above-described construction shown in FIG. 8, three-dimensional distribution tables are formed and converted into tabled of the cumulative type, and the optimum threshold values are determined.

Figure 9:
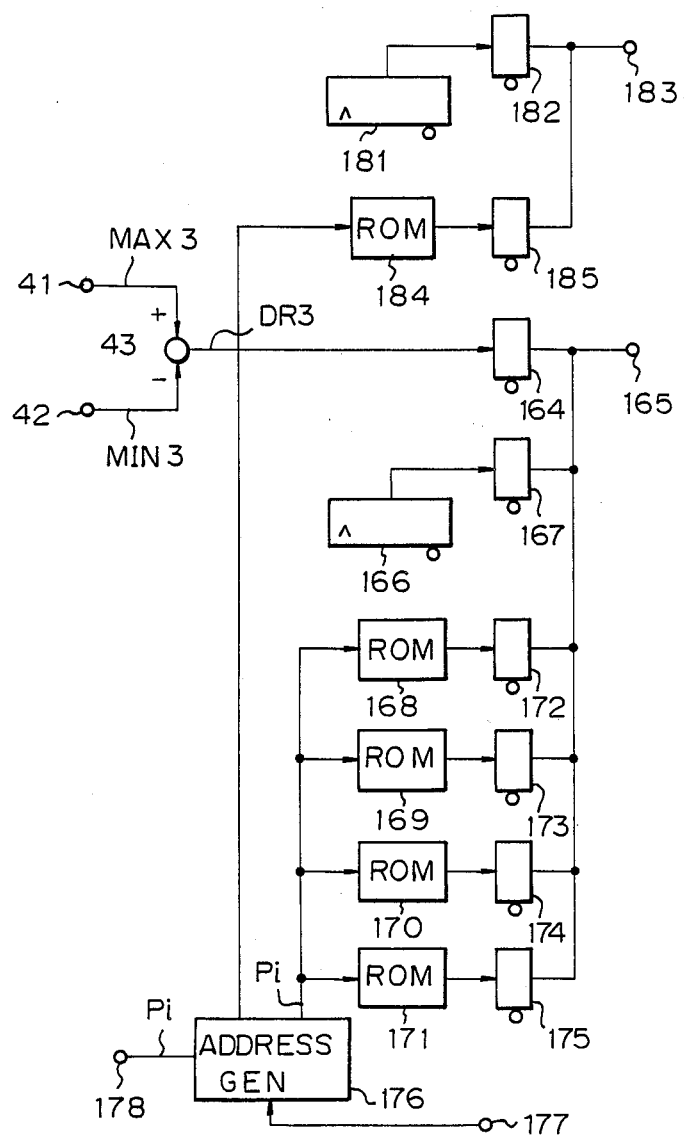
FIG. 9 is a block diagram of an address controller included in the three-dimensional distribution generator of FIG. 8.

Next, an example of a structure of the address controller 44 will be described with reference to FIG. 9. In FIG. 9, the maximum value MAX3 and the minimum value MIN3 are supplied to the input terminals 41 and 42, respectively. The dynamic range DR3 is calculated by the subtraction circuit 43. The dynamic range DR3 is taken out from an output terminal 165 through a register 164 having an output control function. An address generated at the output terminal 165 is the one lying in the vertical (lower) direction of the RAM 46.

Additionally, the output signal of a cumulative counter 166 is derived as an address signal at the output terminal 165 through a register 167 having an output control function.

Further, each the reference numerals of 168, 169, 170 and 171 indicates a respective ROM. For example, eleven kinds of threshold values T1 are stored in the ROM 168. In the other ROMs 169, 170 and 171 are similarly stored eleven kinds of threshold values T2, T3 and T4, respectively. The threshold value code Pi generated at an address generating circuit 176 is applied to the ROMs 168 to 171 as an address.

The output signal of the comparison circuit 58 (FIG. 8) is supplied to the address generating circuit 176 through a terminal 177. An address which varies at a predetermined period is supplied from the circuit 176 to the ROMs 168 to 171 during the "0" period. Threshold values are sequentially read out of the ROMs 168 to 171 until the amount of generated information reaches a value equal to or less than a reference value, that is, until the comparison output signal from the circuit 58 becomes "1". The threshold values read out of the respective ROMs 168 to 171 are taken out at the output terminal 165 through registers 172, 173, 174 and 175 having an output control function. The threshold values are output in that order by the registers 172 to 175.

The threshold value code Pi for designating an optimum threshold value generated at the address generating circuit 176 is taken out at an output terminal 178. The threshold value code Pi is used for ADRC coding and transmitted.

An address in the horizontal (upper) direction of the RAM 46 is generated at an output terminal 183. The above-mentioned address generated at the output terminal 175 is the one relating to the dynamic range DR3, while the address generated at the output terminal 183 is the one relating to the maximum frame difference $\Delta F$.

A cumulative counter 181 develops an address which is taken out at an output terminal 183 through a register 182 with an output control function. The counter 181 generates an address for forming a distribution table.

Also, a ROM 184 is provided, and the output of the ROM 184 is taken out at the output terminal 183 through a register 185 having an output control function. The output of the address generating circuit 176 is applied to the ROM 184. In calculating the amount of generated information, the output signal of the ROM 184 is employed.

The construction of the address controller 64 is similar to that of the address controller 44. Further, in the embodiment of FIGS. 1 and 8, MIN, MAX and DR are separately calculated at the two-dimensional and three-dimensional ADRCs to develop accurate distribution tables. However, there may be a case where distribution tables are formed without making any distinction between the two- and three-dimensional ADRCs and threshold values are determined.

Although the frame-difference detecting circuit 8 is provided separately from the detection circuit 3 in FIG. 1, the maximum frame difference $\Delta F$ obtained from the detection circuit 3 may be stored so that the determination of movement can be achieved using the maximum frame difference. Also, the three-dimensional ADRC encoder 10 and the two-dimensional ADRC encoder 12 may have a common circuit construction.

The present invention, which relates to a high efficiency coding apparatus, such as, a variable-length ADRC for a three-dimensional block, employs the movement threshold value, in addition to the dynamic range DR, to keep the amount of generated information less than a target value, taking into the account that the amount of transmitted information is compressed by the frame-dropping processing in still areas. As a result, by varying the movement threshold value, the areas to be treated as still blocks are increased. Therefore, the threshold values in the level direction may not be strict values. The invention enables the reduction of quantization noises of a reproduced picture.

Also, since the invention makes distribution tables taking into consideration that the dynamic range DR2 of an averaged still block is lowered as compared with an original dynamic range DR3 to reduce the amount of generated information, such amount of generated information can be calculated with high precision.

Although a preferred embodiment of the invention has been described in detail herein with reference to the drawings, it will be apparent to those who are skilled in the art that the invention is not limited to that embodiment, and that various changes and modifications may be effected therein without departing from the scope and spirit of the invention as defined in the appended claims.

What is claimed is:

1. A high efficiency coding apparatus for coding digital video data in a format composed of blocks of digital video data representing a three-dimensional group of picture elements belonging to a plurality of fields and for allowing video data compression for transmission by data transmission means having a predetermined transmission capacity, said apparatus comprising:
   first and second detecting means for detecing maximum and minimum values, respectively, of the digital video data representing the plural picture elements in each of said blocks;
   means for generating dynamic range information for each said block from said maximum and minimum values for the respective block;
   movement detecting means for detecting the amount of movement in each block and for generating a detected amount of movement;
   means for generating distribution tables of said dynamic range information for each movement amount during a predetermined period by setting a first number to a table for a movement amount less than said detected amount of movement and by setting a second number to a table for a movement amount larger than said detected amount of movement;
   means for determining a coding bit number for each block and a threshold value of said movement amount during said predetermined period from said distribution tables and said predetermined transmission capacity of said transmission means;
   means for averaging digital data of plural video fields in a block in which said detected amount of movement is less than said threshold value;
   encoding means for encoding the digital video data with said encoding bit number; and
   means for transmitting an output of said encoding means, a first additional code for each block formed of at least two of said maximum value, minimum value and a signal based on said dynamic range information and a signal based on the detected amount of movement, and a second additional code for each said predetermined period.

2. A high efficiency coding apparatus as claimed in claim 1, wherein said encoding means includes first and second encoding means for two-dimensional and three-dimensional blocks, respectively, output data of said means for averaging is supplied to said first encoding means, and said encoding means further includes selector means for selecting one of the outputs of said first and second encoding means.

3. A high efficiency apparatus as claimed in claim 2, wherein said encoding means includes comparator means for comparing the detected amount of movement for each block and the threshold value, and the output of said comparator means controls said selector means.

4. A high efficiency coding apparatus as claimed in claim 1, wherein said movement detecting means includes first comparators for comparing digital data of a picture element in a first video field or frame and digital data of a corresponding picture element in a second video field or frame, and selecting means for selecting the biggest one of the outputs of said first comparators and generating the detected amount of movement.

5. A high efficiency coding apparatus as claimed in claim 1, wherein said means for determining includes calculating means for calculating the total bit number during said predetermined period on the basis of said distribution tables and comparator means for comparing said total bit number with said predetermined transmission capacity of said data transmission means.

6. A high efficiency coding apparatus as claimed in claim 5, wherein said means for generating includes first generating means for generating first distribution tables of said dynamic range information, and second generating means for generating second distribution tables of integrating type from said first distribution tables.

* * * * *